2,967,592
TELESCOPICALLY EXTENSIBLE POLE

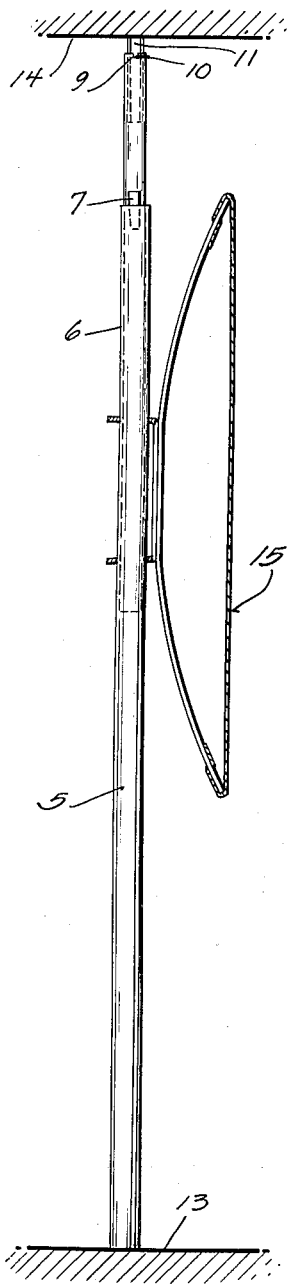
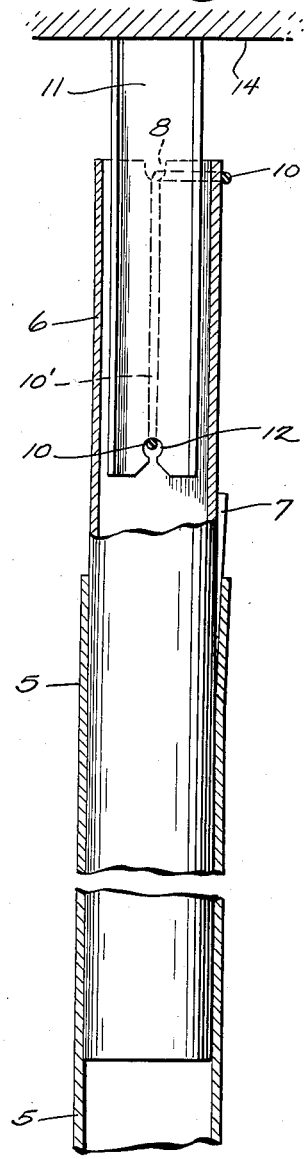
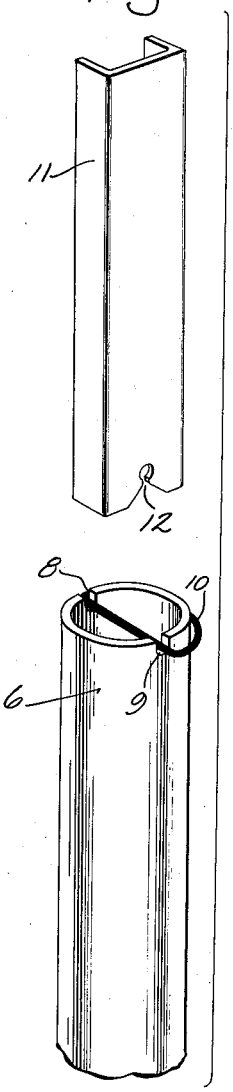
Jan. 10, 1961    E. L. STEIN    2,967,592
TELESCOPICALLY EXTENSIBLE POLE
Filed March 10, 1958
INVENTOR.
ELMER L. STEIN
BY
Wheeler, Wheeler & Wheeler
ATTORNEYS

United States Patent Office 2,967,592
Patented Jan. 10, 1961

Elmer L. Stein, Milwaukee, Wis., assignor to Eye-Beam Displays, Inc., Milwaukee, Wis., a corporation of Wisconsin Filed Mar. 10, 1958, Ser. No. 720,274

5 Claims. (Cl. 189—26)

This invention relates to a telescopically extensible pole.

Telescopically extensible poles are used in a variety of fields. The present device is a lightweight structure specifically designed for supporting advertising matter, but capable of other uses within its strength capacity. It uses a rubber band as a means of extending one section of the pole with respect to another section thereof. The preferred application of the rubber band is in a position in which it encircles approximately one-half of the periphery of the outer of the telescopic members, extending diametrically across the outer member between notches in the end thereof. The inner of the two telescopically related members is transversely notched in registry with the terminal notches at the outer member. Thus, upon telescopic insertion, the inner member picks up that portion of the rubber band which spans the outer member and tensions it, the rubber band acting as a fairly constant bias tending to expel the inner member from the outer member whereby the composite of the inner and outer members comprises an extension pole.

In the drawings:

Fig. 1 is a view in side elevation showing the extension pole in use.

Fig. 2 is an enlarged fragmentary detail view in longitudinal section.

Fig. 3 is a detail view of the parts as they appear in perspective.

In the actual embodiment illustrated, there are three telescopically related sections. There is a base extension section 5 adjustably fixed with respect to primary section 6, as by means of wedge 7. Inasmuch as the rubber band does not permit of any wide range of movement of the part biased by it, it is desirable to secure a preliminary adjustment of the pole to the approximate length of the space available. The sections 5 and 6, once adjusted, are handled unitarily and may be considered as one so far as the yieldable section 11 is concerned.

At its upper end, the pole section 6 is provided with diametrically opposite marginal notches at 8 and 9. The rubber band 10 is disposed in these notches and spans pole section 6 and extends around the outside of the pole section near its end, at the approximate depth of the notches 8 and 9.

The extension pole section 11 is not necessarily of circular cross section. As illustrated it is a channel member of such dimensions as to be reciprocable telescopically in pole section 6. Its web portion is terminally notched at 12 to receive that portion of the rubber band 10 which spans pole section 6 between notches 8 and 9.

When the extension pole section 11 is pushed into pole section 6, its notch 12 picks up the rubber band and tensions the band in the manner indicated in dotted lines at 10′ in Fig. 2. This develops the bias which tends to eject pole section 11 from pole section 6, causing the pole to be engaged securely between a lower supporting surface such as the floor 13 and an upper surface such as the ceiling 14. Thus engaged, the pole will securely hold an advertising display such as that generically designated by reference character 15 and requiring no further description for the purposes of the present disclosure. It will be evident that so far as the operation is concerned the cross sectional form of the several pole sections is immaterial to the invention, as evidenced by the choice of the channel-shaped section 11 to illustrate the invention.

I claim:

1. An extension pole comprising a first section having a central opening and terminal notches at opposite sides of the opening, an elastomeric band engaged in the notches and spanning the opening, said band having a portion hooked around the exterior of the terminal portion of said first section, and a second section telescopically engageable in the opening of the first section and terminally engaged with that portion of the rubber band which spans said opening between said notches, the bias of said band effected by the insertion of the second section into said opening being exerted in a direction to expand the overall length of said sections.

2. The device of claim 1 in which said second section has a wall portion notched substantially in registry with the terminal notches of the first section whereby that portion of the elastomeric band spanning the opening of the first section will be disposed in the notch of the second section as well as those of the first section.

3. The device of claim 1 in which the first section is tubular.

4. The device of claim 3 in which the second section comprises a channel.

5. The device of claim 1 in further combination with a third section adjustable longitudinally of one of the first mentioned sections and having means for securing it in adjustment whereby preliminarily to determine an overall length for the pole within a range within which said elastomeric band will be effective.

References Cited in the file of this patent

UNITED STATES PATENTS

| 1,229,976 | Klais | June 12, 1917 |
| 2,026,199 | Virneberg | Dec. 31, 1935 |